United States Patent
Baker et al.

(10) Patent No.: US 9,890,896 B2
(45) Date of Patent: Feb. 13, 2018

(54) TILT MECHANISM FOR A DISPLAY MONITOR

(71) Applicant: Par Technology Corporation, New Hartford, NY (US)

(72) Inventors: Bernard Baker, Herkimer, NY (US); Kurt Knolle, East Aurora, NY (US); Bernard S. Riedman, Marcy, NY (US); Brian Johnson, Utica, NY (US)

(73) Assignee: Par Technology Corporation, New Hartford, NY (US)

( * ) Notice: Subject to any disclaimer, the term of this patent is extended or adjusted under 35 U.S.C. 154(b) by 0 days.

(21) Appl. No.: 15/279,750

(22) Filed: Sep. 29, 2016

(65) Prior Publication Data

US 2017/0191604 A1    Jul. 6, 2017

Related U.S. Application Data

(60) Provisional application No. 62/232,996, filed on Sep. 25, 2015.

(51) Int. Cl.
| | |
|---|---|
| *A47B 97/04* | (2006.01) |
| *F16M 11/10* | (2006.01) |
| *E05B 73/00* | (2006.01) |
| *F16M 11/38* | (2006.01) |
| *F16M 13/00* | (2006.01) |
| *F16M 11/22* | (2006.01) |
| *G07G 1/00* | (2006.01) |

(52) U.S. Cl.
CPC ............. *F16M 11/10* (2013.01); *E05B 73/00* (2013.01); *F16M 11/22* (2013.01); *F16M 11/38* (2013.01); *F16M 13/00* (2013.01); *G07G 1/0018* (2013.01); *F16M 2200/024* (2013.01)

(58) Field of Classification Search
CPC .. F16M 11/10; F16M 11/22; F16M 2200/024; G07G 1/0018; A47B 2023/047; A47B 23/042; A47B 23/043; A47B 19/08
USPC .......................... 108/6, 7; 248/447, 454–456
See application file for complete search history.

(56) References Cited

U.S. PATENT DOCUMENTS

| | | | | |
|---|---|---|---|---|
| 5,005,669 A | * | 4/1991 | Umebara ................. | A47F 9/046 108/6 |
| 6,354,552 B1 | * | 3/2002 | Chiu ....................... | F16M 11/10 248/422 |
| 2007/0030410 A1 | * | 2/2007 | Cheng ..................... | F16M 11/10 349/58 |
| 2010/0288902 A1 | * | 11/2010 | Liu .......................... | F16M 11/10 248/349.1 |

* cited by examiner

*Primary Examiner* — Christopher Garft
(74) *Attorney, Agent, or Firm* — Bond Schoeneck & King, PLLC; George McGuire

(57) ABSTRACT

The present invention provides a tilt mechanism for a POS monitor. The tilt mechanism permits the monitor to be selectively tilted at various angles ranging between a stowed or flat position and an entirely upright position.

13 Claims, 8 Drawing Sheets

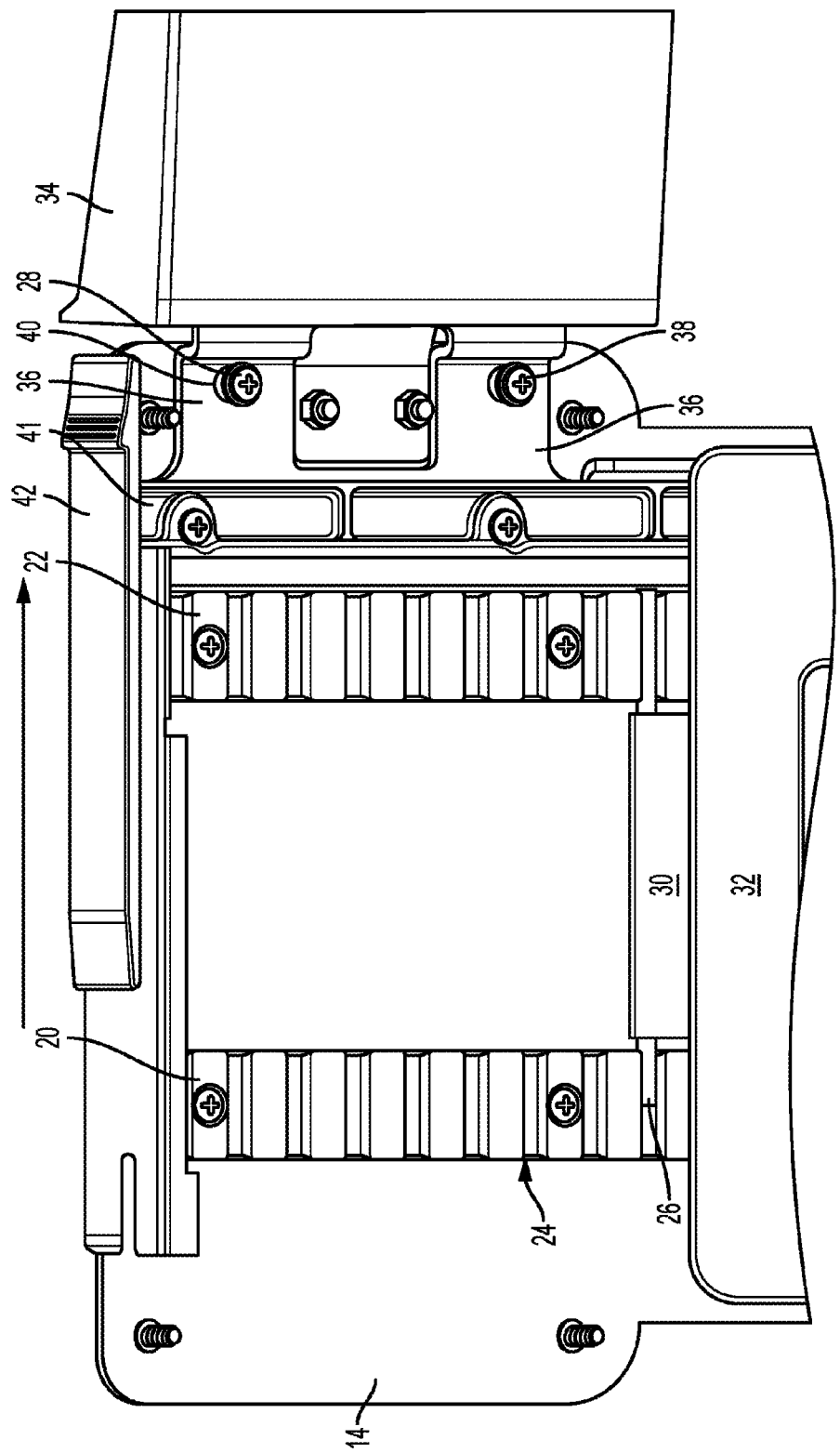

TILT MECHANISM FOR A DISPLAY MONITOR

REFERENCE TO RELATED APPLICATION

The present application relates and claims priority to U.S. Provisional Patent Application Ser. No. 62/232,996, filed Sep. 25, 2015, the entirety of which is hereby incorporated by reference.

BACKGROUND

1. Field of Invention

The present invention relates generally to point of sale terminals, and more specifically to the tilting mechanisms for the monitors of a point of sale terminal.

2. Background of Art

Point of sale terminals are used in a wide variety of retail and hospitality establishments. While traditional POS terminals included a cash register and/or a computer monitor and keyboard used by the worker entering the transaction, in more recent times POS terminals have been equipped with monitors for both the worker and the consumer who can either simply see the entry of the transaction details on a dedicated monitor or may further have the ability to enter part or all of the transaction himself or herself.

For ergonomic reasons, the monitor(s) in the POS system are often equipped with a mechanism that permits them to tilt. Most often the tilt mechanism consists of a frictional pivot wherein the worker simply applies sufficient force to the monitor to overcome the frictional retention of the monitor's position. While such frictional tilt mechanism provide a wide range of tilt angles and ease of use, they also tend to wear over time and lose their frictional retention quality, thus becoming less useful and perhaps even requiring replacement of the mechanism or the entire monitor.

3. Objects and Advantages

It is therefore a principal object and advantage of the present invention to provide a tilt mechanism for a POS monitor that permits selective tilting of the monitor and is durable.

Other objects and advantages of the present invention will in part be obvious and in par appear hereinafter.

SUMMARY OF THE INVENTION

In accordance with the foregoing objects and advantages, the present invention provides a tilt mechanism for a POS monitor. The tilt mechanism permits the monitor to be selectively tilted at various angles ranging between a stowed or flat position and an entirely upright position.

In one embodiment, the present invention provides a tilt mechanism for a point of sale terminal monitor, comprising (1) a base; (2) a monitor mounting plate pivotally mounted to the base and having a rear surface; (3) a rack positioned on the rear surface (or integrated into the rear surface) and comprising a plurality of detents (grooves, in the preferred embodiment, that extend in spaced parallel relation to one another); (4) a support stand assembly comprising a pin that is selectively movable between engaged and disengaged positions relative to any one of the plurality of detents (e.g., grooves), (5) a stand having an upper portion to which the pin is attached and a lower portion that is pivotally mounted to the base; and (6) a tilt actuating member operatively coupled to the pin and selectively movable from a first position wherein the pin is engaged with any one of the detents to a second position wherein the pin is disengaged from any of the detents, whereby the monitor is selectively tiltable when the actuating member is in its second position. In one aspect of the invention the tilt actuating member comprises a paddle pivotally mounted in spring biased relation to one side of the monitor. A worker can pivotally pull the paddle towards himself or herself causing the pin(s) to become disengaged from any of the detents (e.g., grooves) and permitting the monitor to be pivotally moved to a greater or lesser angle relative to the worker. Once satisfied with the tilt of the monitor the worker can release the paddle causing it, via spring bias, to return to its first position which in turn causes the pin(s) to become engaged with the groove at the corresponding position, thereby stably fixing the position of the monitor.

In an aspect of the invention, the tilt actuating member is movably attached to the rear surface of the monitor by hinge plates that include fasteners passing therethrough to connect to the monitor and each of which includes a spring compressed between the fastener head and the actuating member. The tilt mechanism is further connected to a pull bar that in turn is attached to/engaged with the pin(s) (and a leaf spring provides further spring bias to the tilt mechanism). When the worker pulls the actuating member toward himself or herself the springs on the hinge plates become compressed, the pull bar is pushed away from the back of the monitor, thereby causing the pin to disengage from the detent (e.g., groove) on the back of the monitor. When releasing the actuating member the spring force automatically pulls the actuating member back to its neutral position, causing the pull bar to move towards the monitor and the pin(s) back into engagement with a detent (e.g., groove). A longitudinally sliding lock is provided on top of the monitor and is movable between two positions that prevent or permit, respectively, the actuating member from being moved. Thus, to prevent inadvertent movement of the actuating member, the lock can be slid into its locking position which physically intersects with and blocks the pull bar from being moved, thus preventing the actuating member from being moved by the worker.

BRIEF DESCRIPTION OF THE DRAWINGS

The present invention will be more fully understood and appreciated by reading the following Detailed Description in conjunction with the accompanying drawings, in which:

FIG. 5 is a partial perspective view of the tilt mechanism in its locked and engaged position;

DETAILED DESCRIPTION

Figure 1:
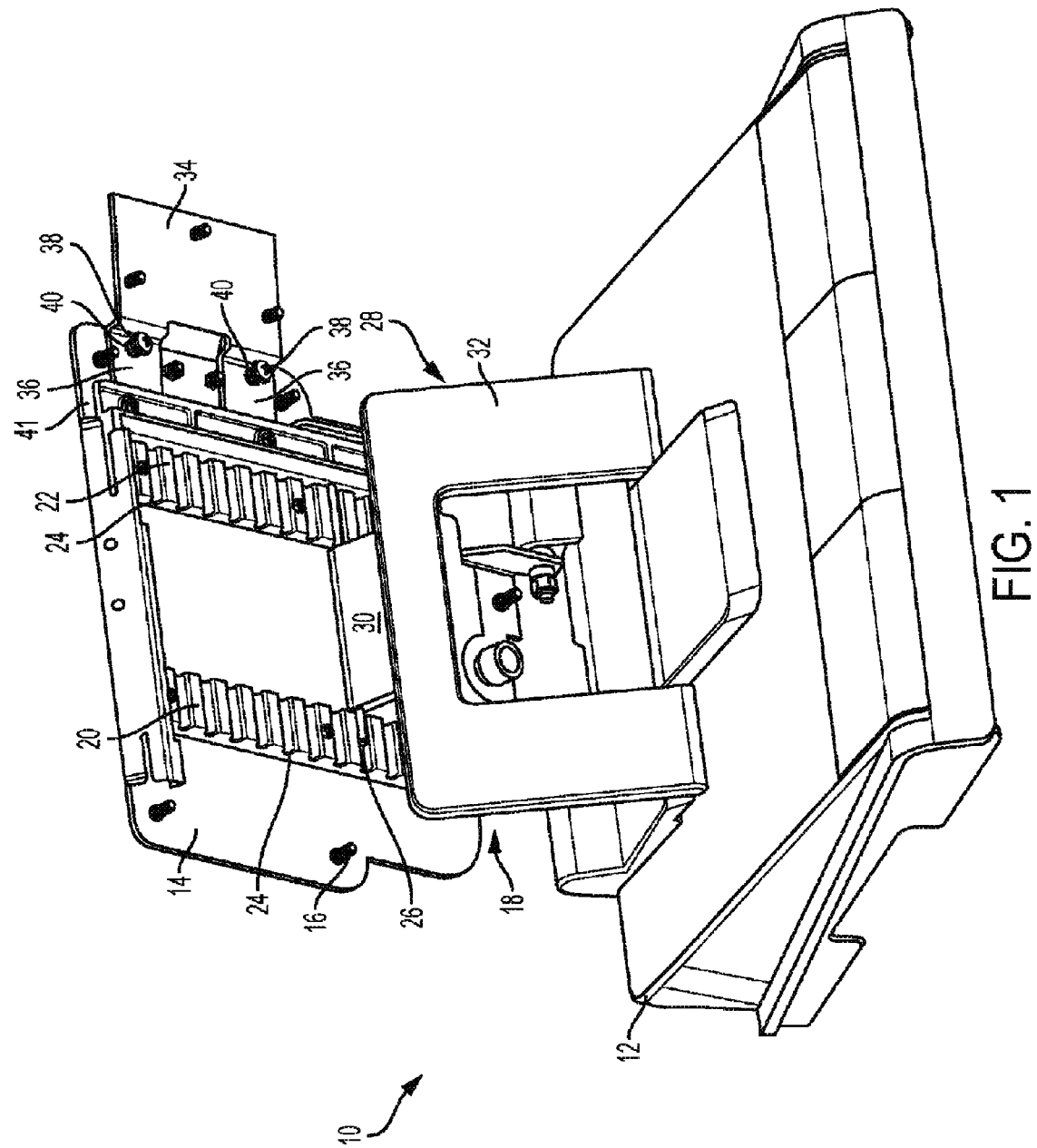
FIG. 1 is a perspective view of an embodiment of the present invention.
Figure 2:
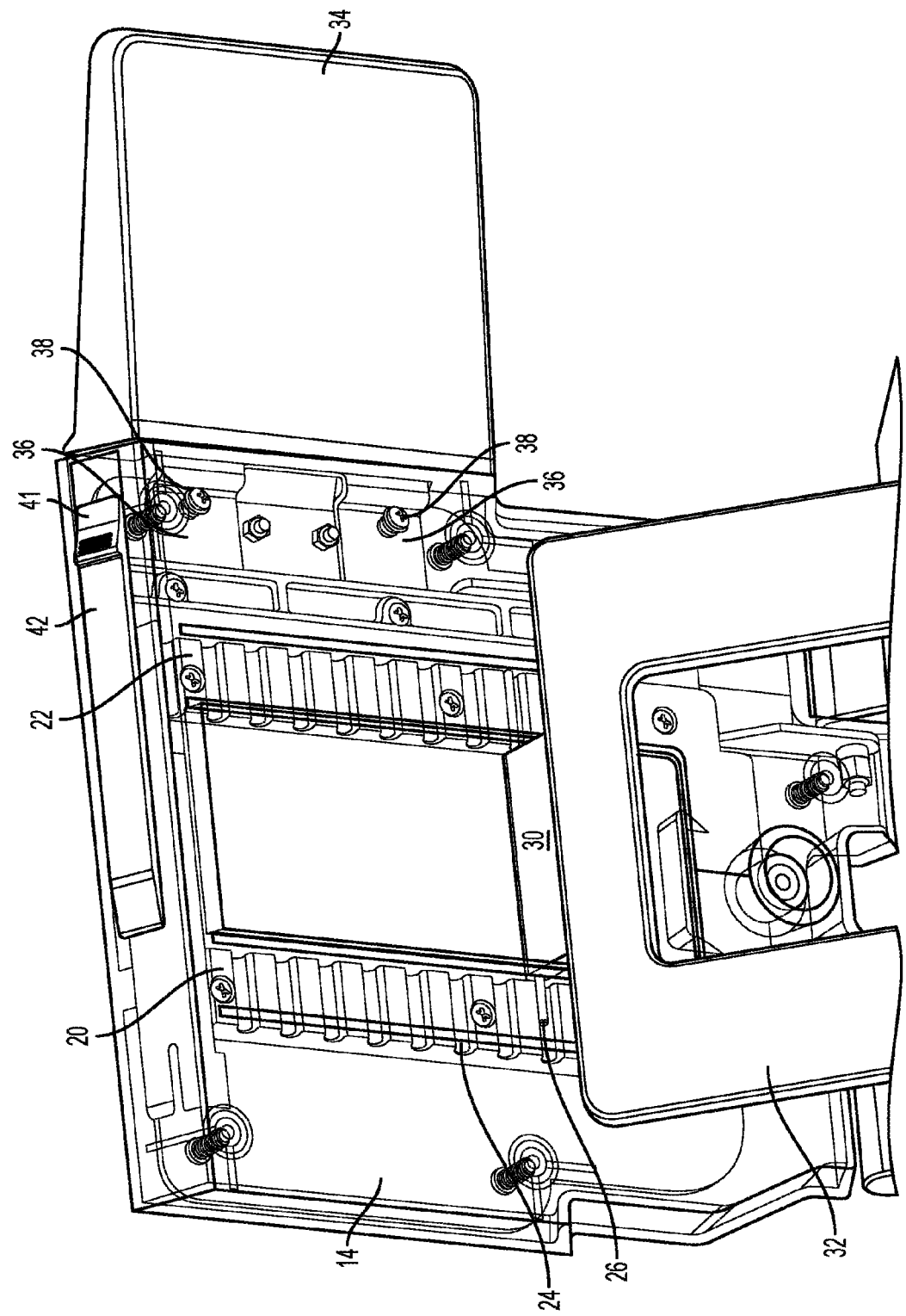
FIG. 2 is a partial perspective view of the tilt mechanism in its locked and engaged position.
Figure 3:
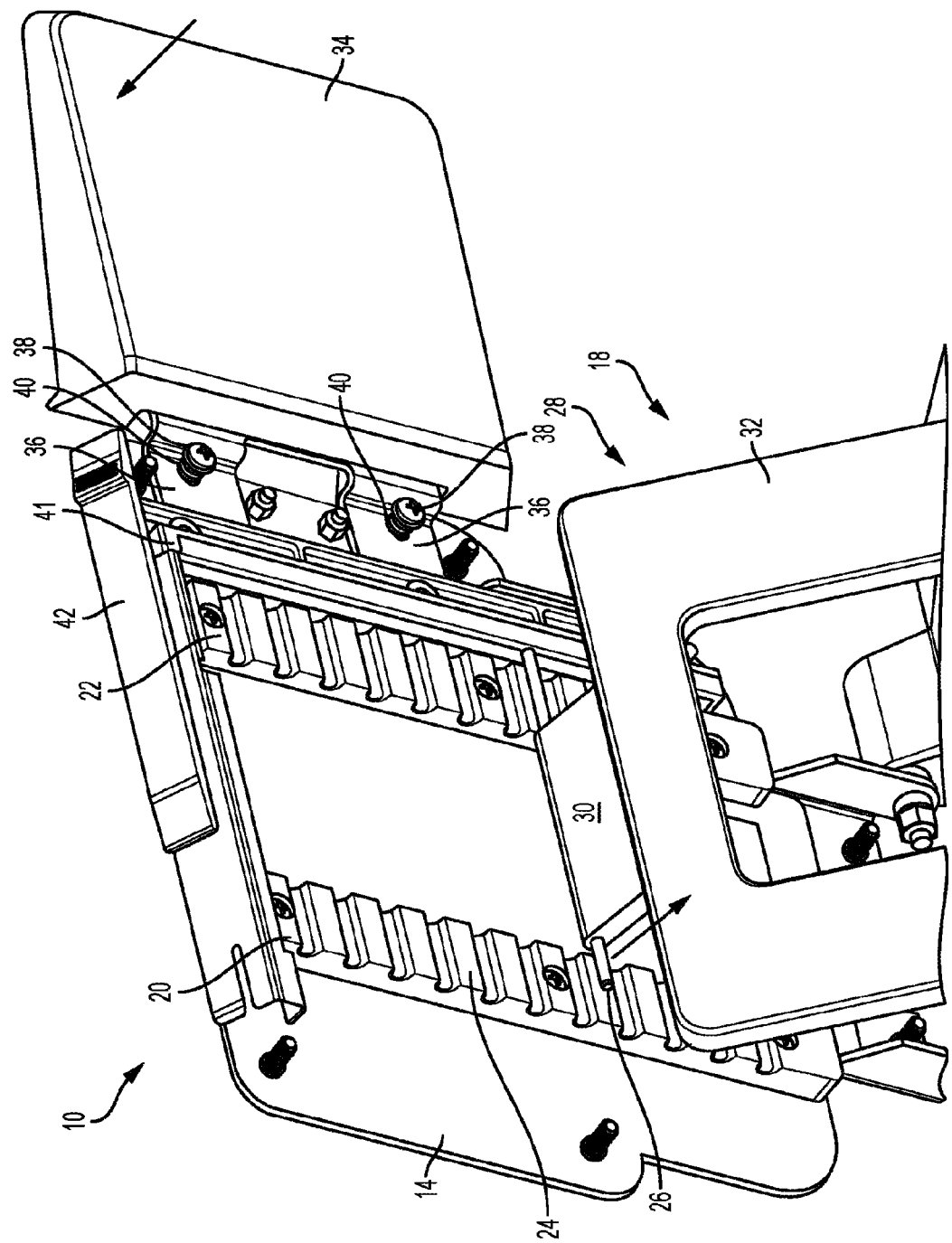
FIG. 3 is a partial perspective view of the tilt mechanism in its unlocked and disengaged position.
Figure 4B:
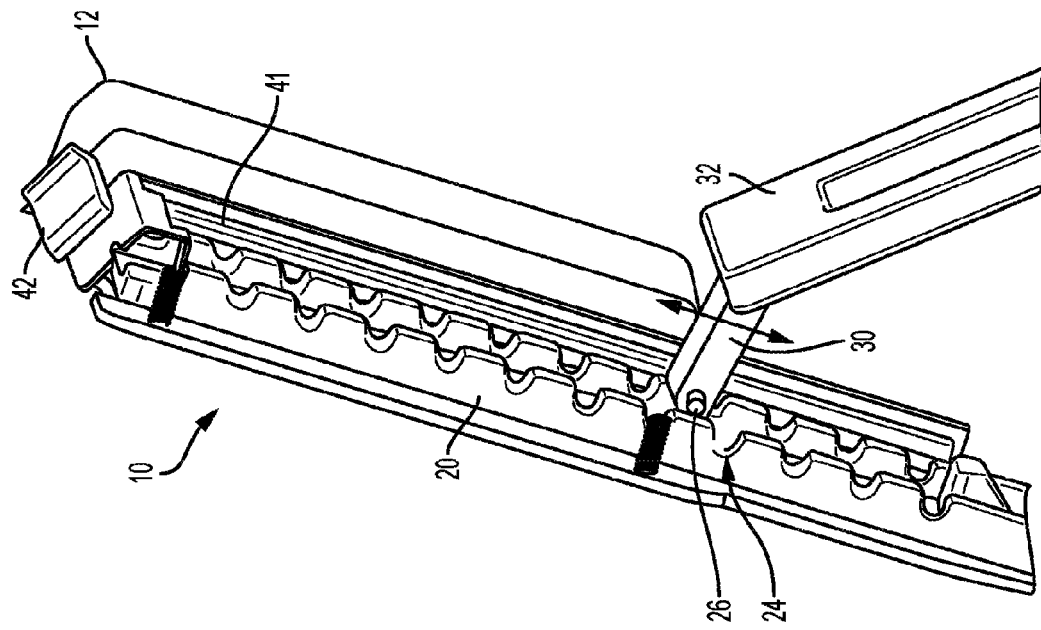
FIGS. 4(A) and 4(B) are side elevation views illustrating the tilt mechanism in its locked and unlocked positions, respectively.
Figure 4A:
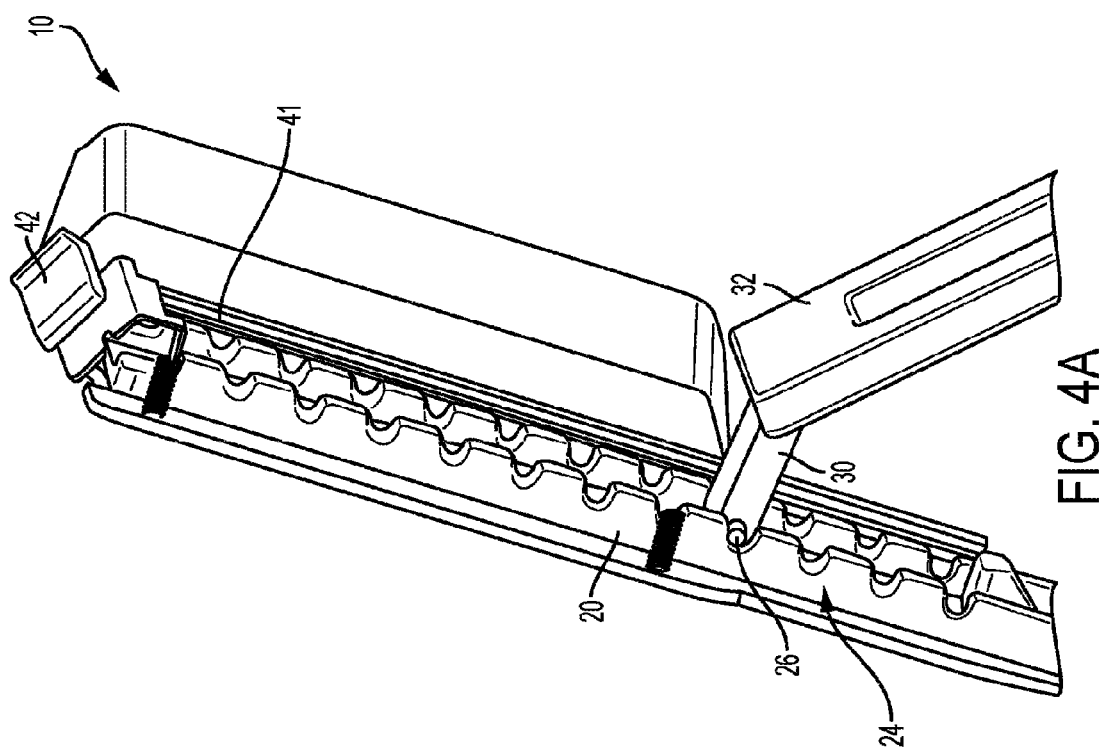

Referring now to the drawings, wherein like reference numerals refer to like parts throughout, there is seen in FIG.

Figure 8:
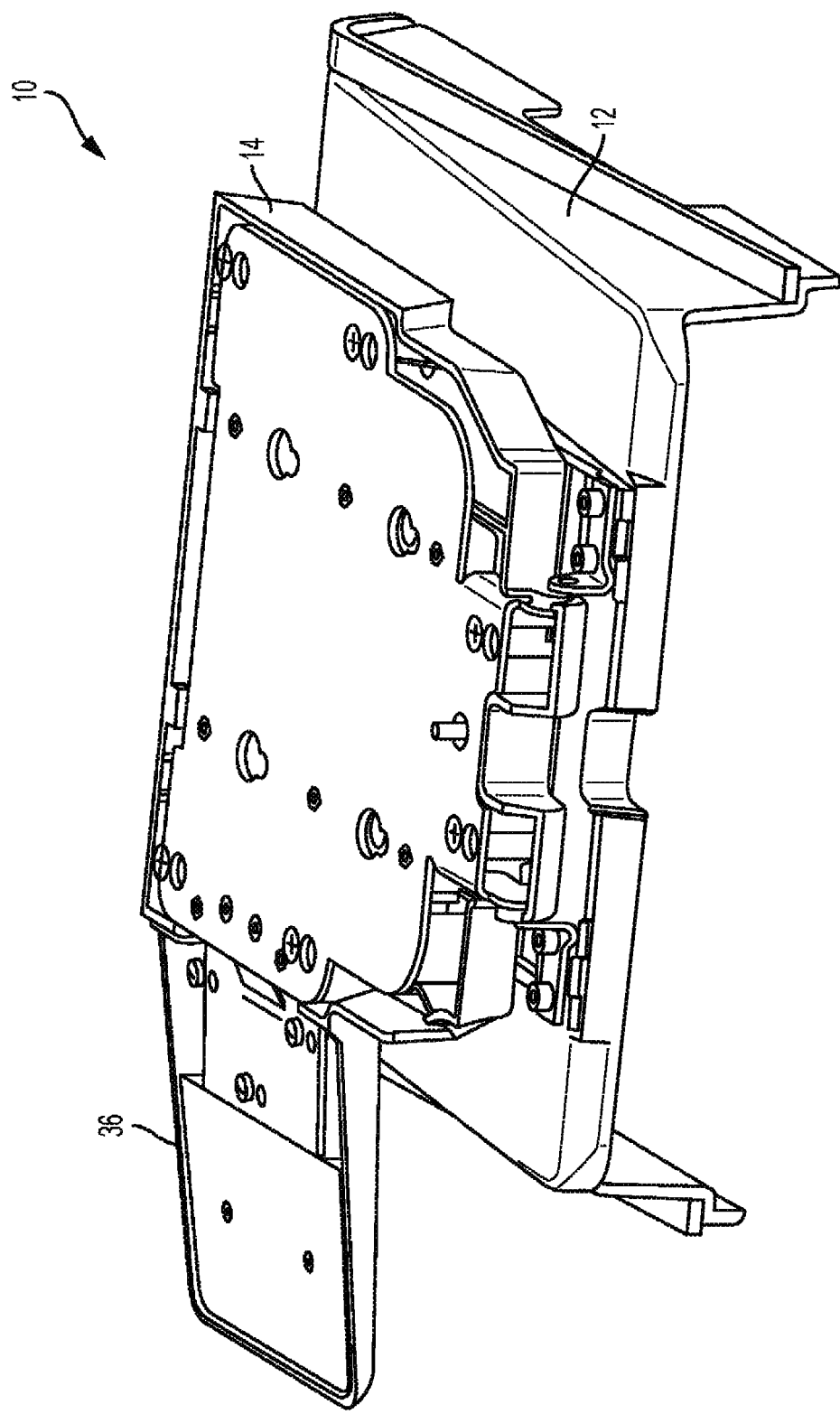
FIG. 8 is a frontal perspective view of an embodiment of the present invention with the monitor assembly in its stowed/shipped position.

1 a tilt mechanism/assembly for point of sale (POS) terminal monitor, designated generally by reference numeral 10, essentially comprising a base 12, a monitor mounting plate 14 pivotally attached to base 12, a rack assembly 16 mounted to the rear surface of monitor mounting plate 14 (or integrated into the structure of monitor mounting plate 14), and a support stand assembly 18 pivotally connected to base 12 and in releasable engagement with rack 16. Support stand assembly 18 permits monitor 14 to be stably fixed in a user selectable angular position relative to a worker operating POS terminal tilt assembly 10, and further permits monitor 14 to be laid essentially flat in overlying relation to base 12 for shipping purposes, as illustrated in FIG. 8.

In its preferred embodiment, rack assembly 16 comprises a pair of laterally spaced apart rails 20, 22 attached to the rear surface of monitor 14 and each of which includes a plurality of grooves 24. Grooves 24 each extend in spaced parallel relation to the others along horizontally extending axes (each of which is transverse to the parallel, longitudinal axes of rails 20, 22). It should be understood that other forms of detent could be used in place of grooves (e.g., circular indentations, magnets, etc . . . )

Support stand assembly 18 comprises a pin 26 that is selectively movable between engaged and disengaged positions relative to any one of the plurality of grooves 24, as will be explained further hereinafter, and a stand 28 having an upper portion 30 to which pin 26 is attached and a lower portion 32 that is pivotally mounted to the base 12.

Tilt mechanisms 10 further comprises a tilt actuating member 34 in the form of a paddle operatively coupled to pin 26 and selectively movable from a first position wherein pin 26 is engaged with any one of grooves 24 to a second position wherein pin 26 is disengaged from any of grooves 24, whereby the monitor 14 is selectively tiltable when the actuating member 34 is in its second position. More specifically, tilt actuating mechanism 34 is movably attached to the rear surface of the monitor 14 by hinge plates 36 that include fasteners 38 passing therethrough to connect to the monitor 14 and each of which includes a spring 40 compressed between the fastener head and the tilt actuating member 34. Tilt mechanism 34 is also attached to a pull bar 41 that in turn is attached to the pin 26. When the worker pulls the actuating member 36 toward him or herself the springs 40 become compressed and the pull bar 41 is moved away from the rear surface of the monitor 14 causing the pin 26 to disengage from the groove 24. When releasing the actuating member 34 the bias force of the springs 40 automatically pulls the pull bar 41 back causing the pin 26 to engage with a correspondingly located groove 24.

Figure 6A:
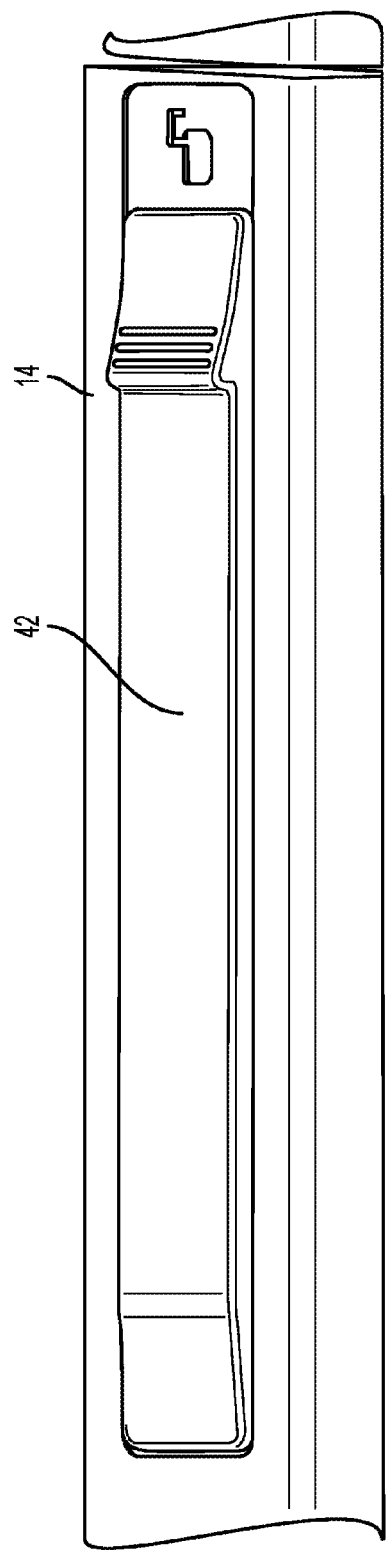
FIGS. 6(A) and 6(B) are top plan views of the monitor and its lock in its unlocked and locked positions, respectively.
Figure 6B:
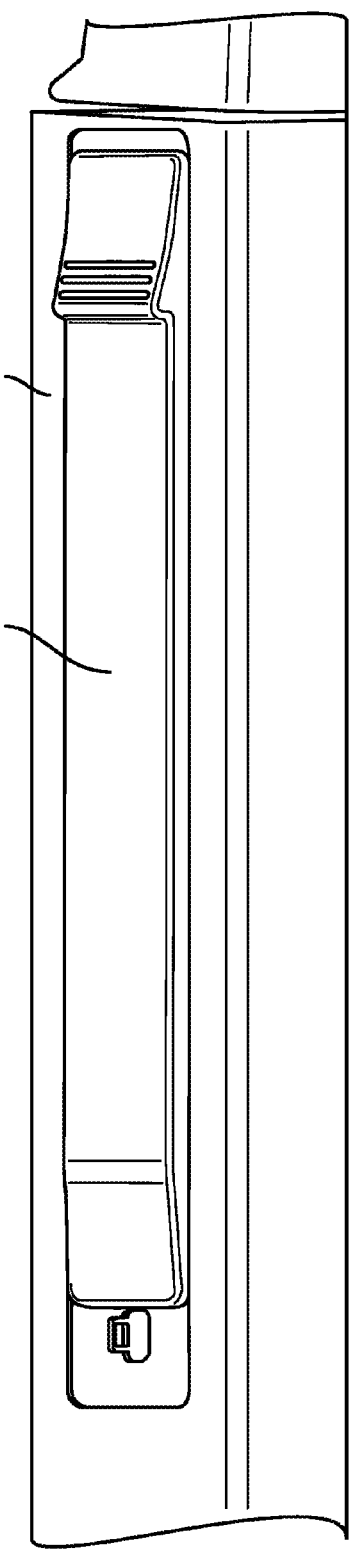

Tilt mechanism 10 further comprises a lock 42 that is slidably mounted atop monitor 14. Lock 42 is selectively movable between its unlocked (FIG. 6(A)) and locked (FIG. 6(B)) positions. When in the locked position, lock 42 interferes with pull bar 41, physically preventing tilt actuating mechanism 34 from moving, thus preventing inadvertent disengagement of pin 26 from grooves 24. When it is desired to tilt monitor 14, the lock 42 may be slid along its longitudinal axis to its unlocked position freeing pull bar 41 and permitting tilt actuating mechanism 34 to be moved and the monitor 14 selectively adjusted.

Figure 7:
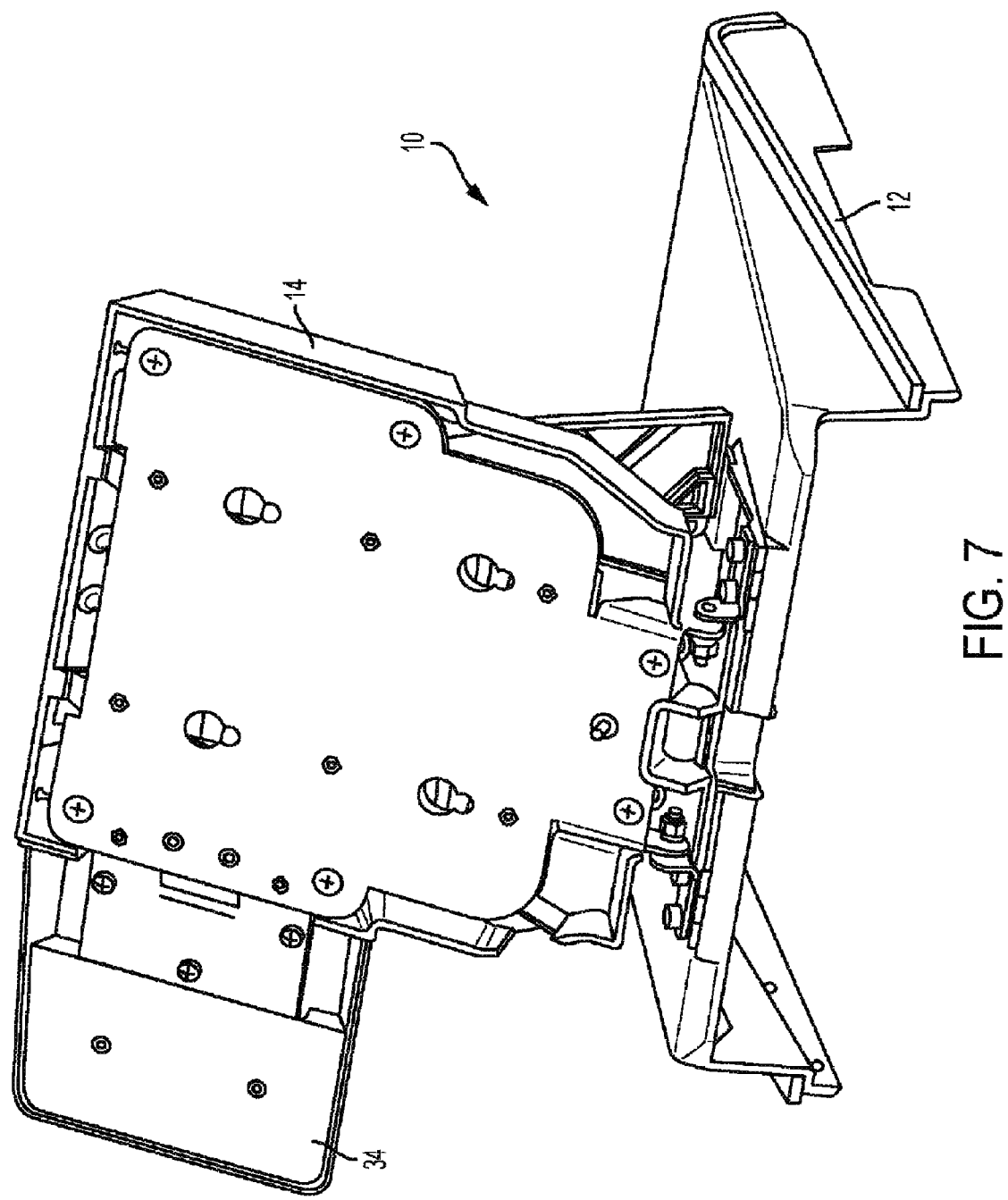
FIG. 7 is a frontal perspective view of an embodiment of the present invention with the monitor assembly in its deployed position.

With reference to FIGS. 7 and 8, monitor 14 is pivotally movable from a completely stowed position (FIG. 8), wherein it lies flat in overlying relation to base 12 and which is useful when shipping tilt mechanism 10, to an upright position that is at a desired angle relative to a worker operating POS terminal monitor mounting plate (and hence the terminal monitor) 14.

What is claimed is:

1. A tilt mechanism for a point of sale terminal monitor, comprising:
   a) a base;
   b) a monitor mounting plate pivotally mounted to said base and having a rear surface;
   c) a rack positioned on said rear surface and comprising a plurality of detents formed therein;
   d) a support stand assembly comprising:
      i) a pin that is selectively movable between engaged and disengaged positions relative to any one of said plurality of detents, and
      ii) a stand having an upper portion to which said pin is attached and a lower portion that is pivotally mounted to said base; and
   e) a tilt actuating member operatively coupled to said pin and selectively movable from a first position wherein said pin is engaged with any one of said detents to a second position wherein said pin is disengaged from any of said detents, whereby said monitor is selectively tiltable when said actuating member is in its second position;
   f) a lock movable between locked and unlocked positions, wherein said tilt actuating member is prevented from or permitted to be selectively moved, respectively.

2. The tilt mechanism according to claim 1, wherein said tilt actuating mechanism comprises a user accessible paddle that is coupled to said pin and is movably connected to said monitor mounting plate.

3. The tilt mechanism according to claim 2, further comprising a hinge plate connected to said monitor mounting plate and to which said tilt mechanism is attached.

4. The tilt mechanism according to claim 3, further comprising a fastener having a fastener head that connects said hinge plate to said monitor mounting plate, and a spring member compressingly positioned between said hinge plate and said fastener head.

5. The tilt mechanism according to claim 4, further comprising a pull bar that is connected to said pin and said tilt actuating mechanism and is movable with said tilt mechanism.

6. The tilt mechanism according to claim 5, further comprising a lock movable between locked and unlocked positions, wherein said lock is positioned in physically interfering relation to said pull bar when in said locked position and is positioned in physically unblocking relation to said pull bar when in said unlocked position.

7. The tilt mechanism according to claim 1, wherein said detents each comprise a groove.

8. The tilt mechanism according to claim 1, wherein said rack comprises first and second rails each attached to said monitor mounting plate and extending long respective longitudinal axes that are in spaced parallel relation to one another, wherein each of said first and second rails comprises a plurality of grooves formed therein that each extend along respective axes that are perpendicular to the longitudinal axes of said first and second rails.

9. A tilt mechanism for a point of sale terminal monitor, comprising:
   a) a base;
   b) a monitor mounting plate pivotally mounted to said base and having a rear surface;
   c) a rack positioned on said rear surface and comprising a plurality of detents formed therein;
   d) a support stand assembly comprising:

i) a pin that is selectively movable between engaged and disengaged positions relative to any one of said plurality of detents, and
   ii) a stand having an upper portion to which said pin is attached and a lower portion that is pivotally mounted to said base; and
e) a tilt actuating member operatively coupled to said pin and selectively movable from a first position wherein said pin is engaged with any one of said detents to a second position wherein said pin is disengaged from any of said detents, whereby said monitor is selectively tiltable when said actuating member is in its second position;
wherein said told actuating mechanism comprises a user accessible paddle that is coupled to said pin and is movably connected to said monitor mounting plate; a hinge plate connected to said monitor mounting plate and to which said tilt mechanism is attached; and a fastener having a fastener head that connects said hinge plate to said monitor mounting plate, and a spring member compressingly positioned between said hinge plate and said fastener head.

10. The tilt mechanism according to claim 9, further comprising a pull bar that is connected to said pin and said tilt actuating mechanism and is movable with said tilt mechanism.

11. The tilt mechanism according to claim 10, further comprising a lock movable between locked and unlocked positions, wherein said lock is positioned in physically interfering relation to said pull bar when in said locked position and is positioned in physically unblocking relation to said pull bar when in said unlocked position.

12. The tilt mechanism according to claim 9, wherein said detents each comprise a groove.

13. The tilt mechanism according to claim 9, wherein said rack comprises first and second rails each attached to said monitor and extending long respective longitudinal axes that are in spaced parallel relation to one another, wherein each of said first and second rails comprises a plurality of grooves formed therein that each extend along respective axes that are perpendicular to the longitudinal axes of said first and second rails.

* * * * *